US011594866B2

(12) United States Patent
Keskar et al.

(10) Patent No.: US 11,594,866 B2
(45) Date of Patent: Feb. 28, 2023

(54) CABLE TRAY BARRIER STRIP

(71) Applicant: Eaton Intelligent Power Limited, Dublin (IE)

(72) Inventors: Harshad Keskar, Pune (IN); Amol Khalkar, Nashik (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/162,705

(22) Filed: Jan. 29, 2021

(65) Prior Publication Data
US 2021/0242671 A1 Aug. 5, 2021

Related U.S. Application Data

(60) Provisional application No. 62/967,757, filed on Jan. 30, 2020.

(51) Int. Cl.
*F16M 11/00* (2006.01)
*H02G 3/04* (2006.01)

(52) U.S. Cl.
CPC ......... *H02G 3/0443* (2013.01); *H02G 3/0406* (2013.01)

(58) Field of Classification Search
CPC .. H02G 3/0406; H02G 3/0443; H02G 3/0456; F16L 3/22
See application file for complete search history.

(56) References Cited

U.S. PATENT DOCUMENTS

| 4,675,970 | A   | * | 6/1987  | Galen    | A47B 57/58  |
|           |     |   |         |          | 211/184     |
| 5,199,584 | A   | * | 4/1993  | Fowler   | A47F 5/0043 |
|           |     |   |         |          | 211/184     |
| 6,023,024 | A   | * | 2/2000  | Stjerneby| H02G 3/0443 |
|           |     |   |         |          | 174/99 R    |
| 6,460,710 | B1  | * | 10/2002 | Dardashti| A47B 57/26  |
|           |     |   |         |          | 211/187     |
| 7,682,465 | B2  | * | 3/2010  | Anderson | A47L 15/0084|
|           |     |   |         |          | 211/41.9    |
| 7,793,790 | B2  | * | 9/2010  | Lee      | A47L 15/505 |
|           |     |   |         |          | 211/41.9    |
| 8,097,808 | B2  | * | 1/2012  | Quertelet| H02G 3/0443 |
|           |     |   |         |          | 174/99 R    |
| 8,820,018 | B2  | * | 9/2014  | Maley    | E04F 19/061 |
|           |     |   |         |          | 52/489.1    |
| 10,003,180| B1  | * | 6/2018  | Krietzman| F16L 3/22   |
| 10,433,658| B1  | * | 10/2019 | Kologe   | A47F 3/14   |
| 2008/0066401| A1| * | 3/2008  | Jette    | H02G 3/0443 |
|           |     |   |         |          | 52/220.1    |

(Continued)

OTHER PUBLICATIONS 30, 54,105, 150 Divider Strip—COT, Iegrand, 1 page, 2012.

(Continued)

*Primary Examiner* — Amy J. Sterling
(74) *Attorney, Agent, or Firm* — Stinson LLP

(57) ABSTRACT

A barrier strip for a cable tray of the type including longitudinal wires and lateral wires interconnecting the longitudinal wires includes a vertical wall extending along a length of the barrier strip. A tray coupler is below the vertical wall. The tray coupler couples to one or more of the longitudinal and lateral wires of the cable tray without the use of additional fasteners.

15 Claims, 10 Drawing Sheets

(56) References Cited

U.S. PATENT DOCUMENTS

| | | | | |
|---|---|---|---|---|
| 2010/0101855 A1* | 4/2010 | Handler | ................ | H02G 3/105 |
| | | | | 174/505 |
| 2013/0075352 A1* | 3/2013 | Mitten | ................... | B65G 1/023 |
| | | | | 211/183 |
| 2015/0078809 A1* | 3/2015 | Winn | ................... | H02G 3/0443 |
| | | | | 403/188 |
| 2019/0123529 A1* | 4/2019 | Hopkinson | .............. | H02G 3/03 |

OTHER PUBLICATIONS

Divider Post BL Installation, WBT LLC, Apr. 27, 2016, 1 page.
Snap Track Dividers, TechLine MFG, at least as early as Nov. 6, 2019, 1 page.

* cited by examiner

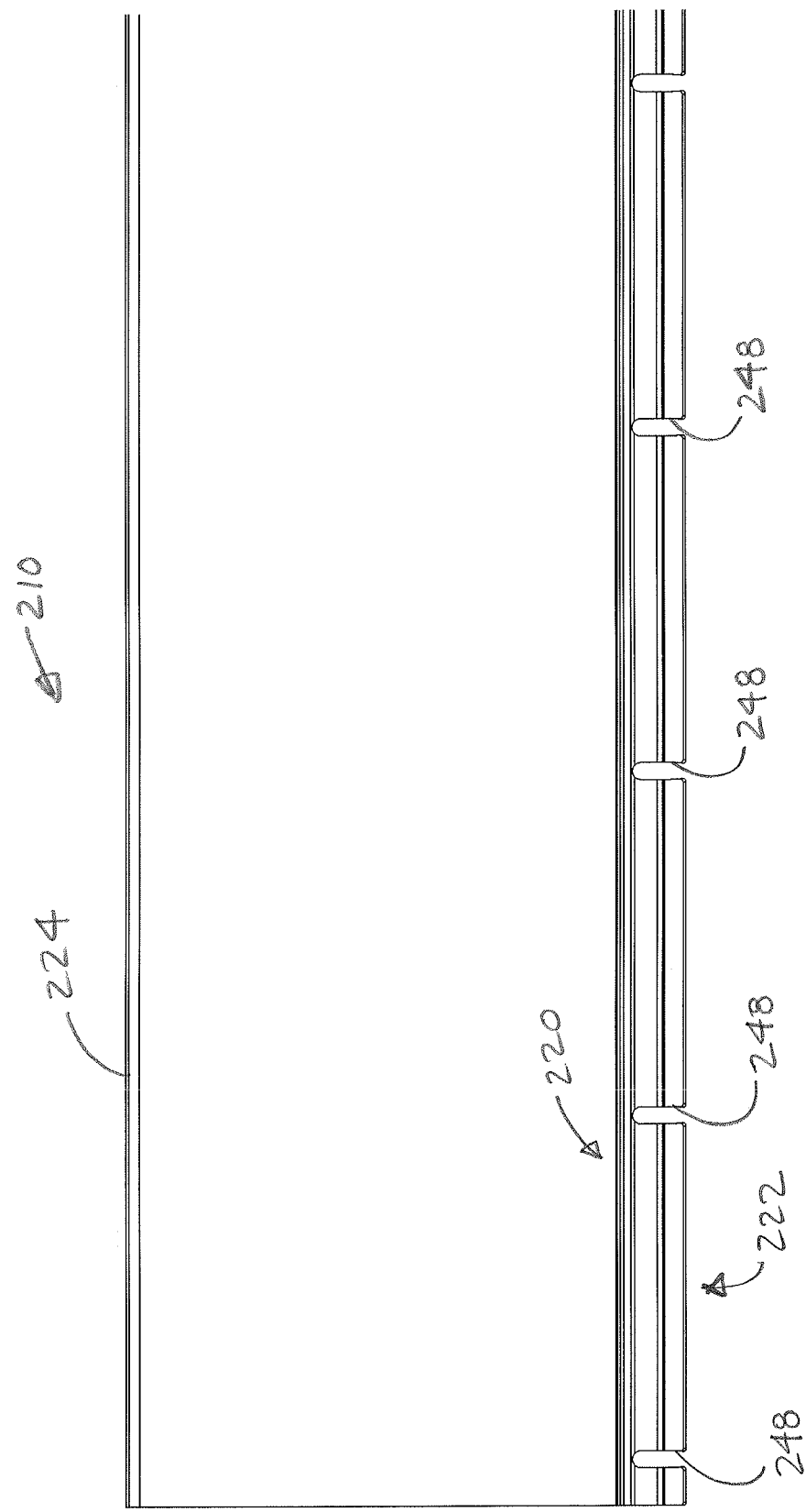

CABLE TRAY BARRIER STRIP

STATEMENT OF RELATED CASES

This application is a non-provisional application of U.S. Ser. No. 62/967,757, filed Jan. 30, 2020, the entire contents of which are incorporated herein by reference.

FIELD OF THE DISCLOSURE

The present disclosure generally relates to a barrier strip for a cable tray.

BACKGROUND OF THE DISCLOSURE

One type of cable tray is a wire mesh cable tray including longitudinal metal wires and lateral metal wires secured to one another. One or more barrier strips may be used to divide the cable tray into one or more longitudinal sections, such as for separating different types of cable, wires, fibers, or other components running along and within the cable tray. A conventional barrier strip is generally L-shaped in cross section including an upstanding wall extending from a base. The base includes an opening configured to receive a fastener to secure the barrier strip to one of the lateral metal wires. The conventional barrier strip is formed from metal.

BRIEF DESCRIPTION OF THE DRAWINGS

FIG. 10 is partial front elevational view of the barrier strip of FIG. 7.

Corresponding reference characters indicate corresponding parts throughout the drawings.

DETAILED DESCRIPTION OF THE DISCLOSURE

Figure 1:
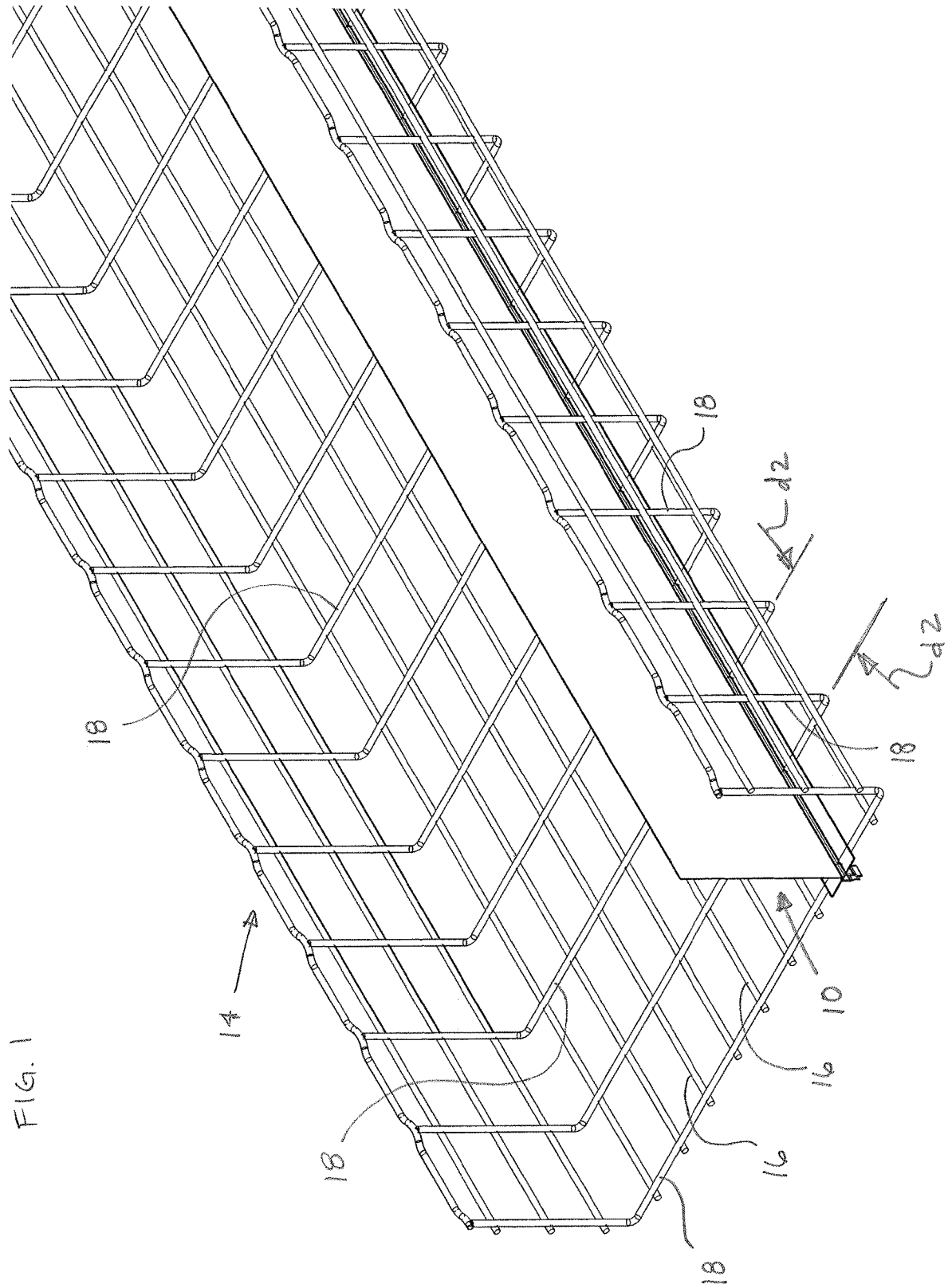
FIG. 1 is a partial perspective of a cable tray assembly including a cable tray and barrier strip coupled to the cable tray.

Referring to FIGS. 1-4, one embodiment of a barrier strip for a cable tray is generally indicated at reference numeral 10. As explained in more detail below, the barrier strip 10 is configured to couple to a cable tray, generally indicated at 14, to divide the cable tray into one or more longitudinal sections, such as for separating different types of cable, wires, fibers, or other components running along and within the cable tray. In particular, the barrier strip 10 is configured to couple to a wire mesh cable tray 14 including longitudinal metal wires 16 and lateral metal wires 18 secured to one another.

Figure 3:
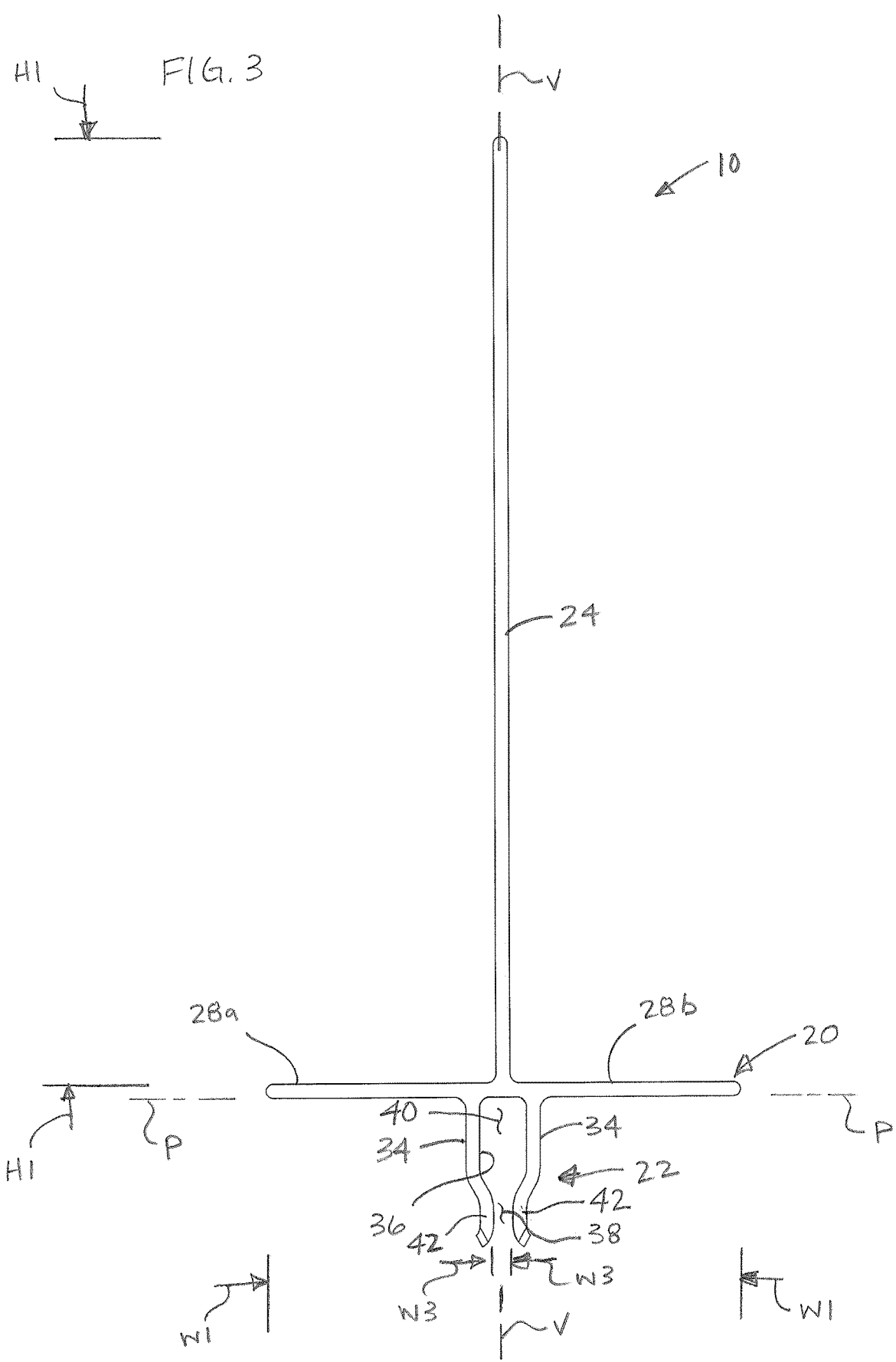
FIG. 3 is a left elevational view of the barrier strip of FIG. 1.
Figure 4:
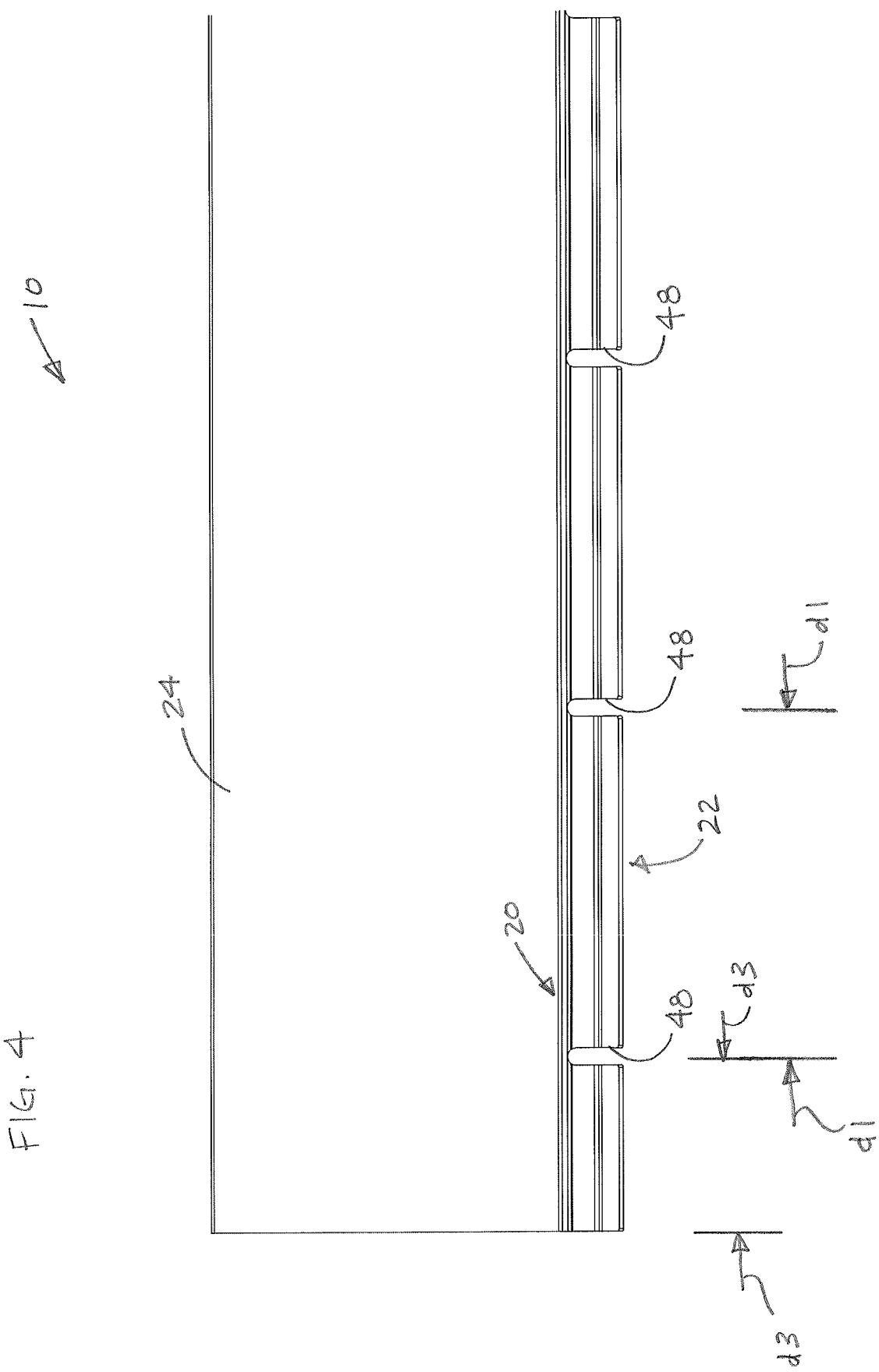
FIG. 4 is partial front elevational view of the barrier strip of FIG. 1.
Figure 5:
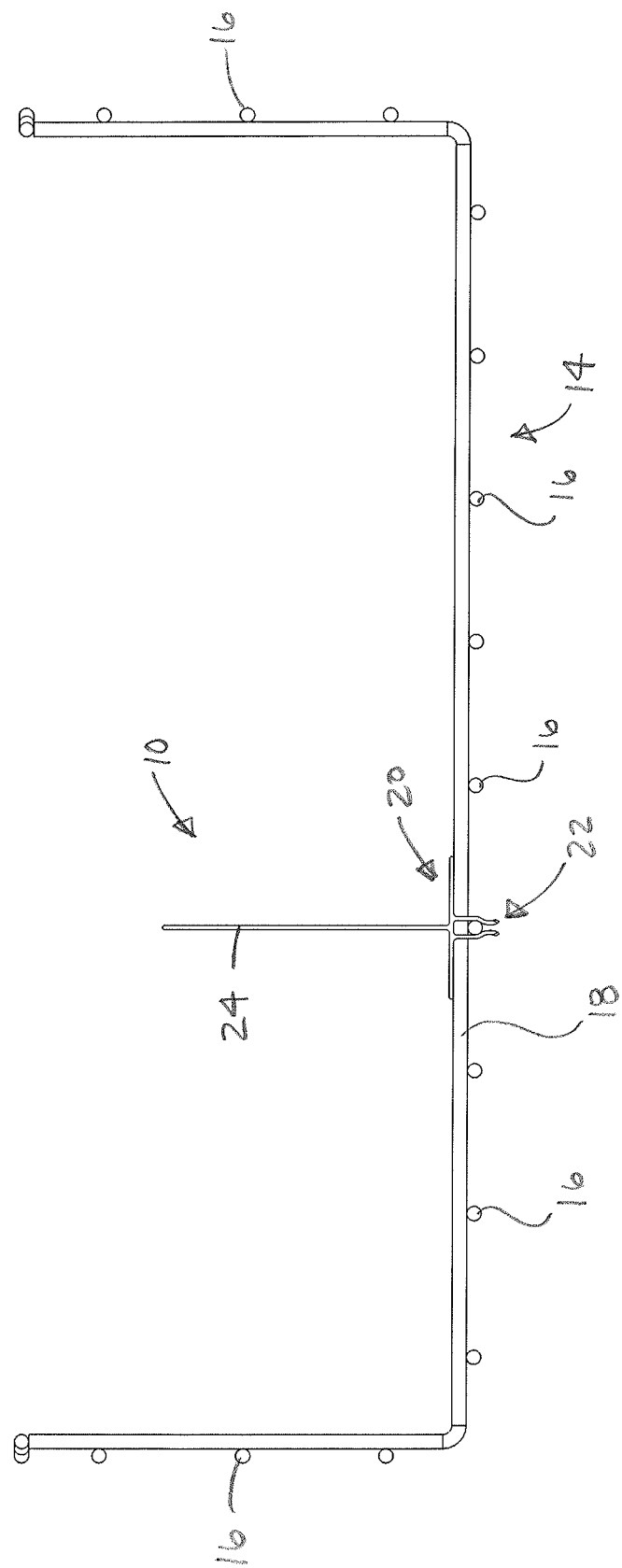
FIG. 5 is a front elevational view of a cable tray assembly including the cable tray of FIG. 1 and another embodiment of a barrier strip coupled to the cable tray.

Referring to FIGS. 3 and 4, the barrier strip 10 has a vertical axis V (FIG. 3) and includes a base, generally indicated at 20, a tray coupler, generally indicated at 22, extending downward from an lower end the base, and a vertical wall 24 extending upward from the an upper end of the base. In the illustrated embodiment, the base 20, the tray coupler 22, and the vertical wall 24 are integrally, and monolithically formed as a one-piece component. The base 20, the tray coupler 22, and the vertical wall 24 may be suitably formed from plastic (e.g., a thermoplastic), metal (e.g., sheet metal), or other material. Suitable types of plastic include polyethylene (PE), polypropylene (PP), polyvinyl chloride (PVC), among others. In one example, the base 20, the tray coupler 22, and the vertical wall 24 may be formed from plastic and include material suitable for electromagnetic interference/electromagnetic compatibility (EMI/EMC) shielding. For example, plastic barrier strip 10 may be coated with material (e.g., metal) suitable for EMI/EMC shielding or the plastic material may be impregnated with material suitable for EMI/EMC shielding. The base 20, the tray coupler 22, and the vertical wall 24 may be suitably formed by extrusion, molding, fabrication, or in other ways. It is understood that one or more of the base 20, the tray coupler 22, and the vertical wall 24 may be formed separately and subsequently secured to the other component(s) to form the barrier strip.

Figure 2:
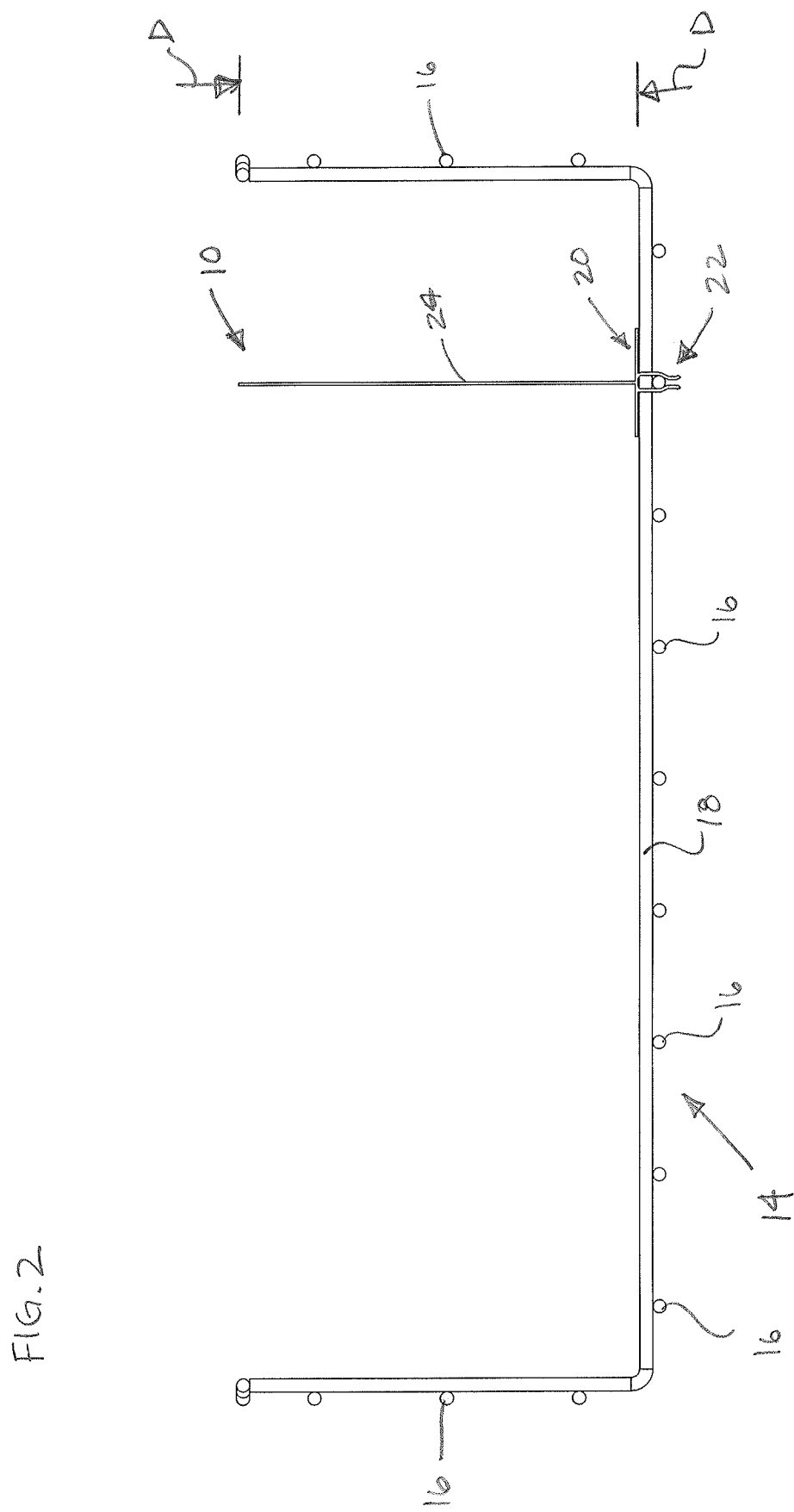
FIG. 2 is a left elevational view of the cable tray assembly of FIG. 1.
Figure 6:
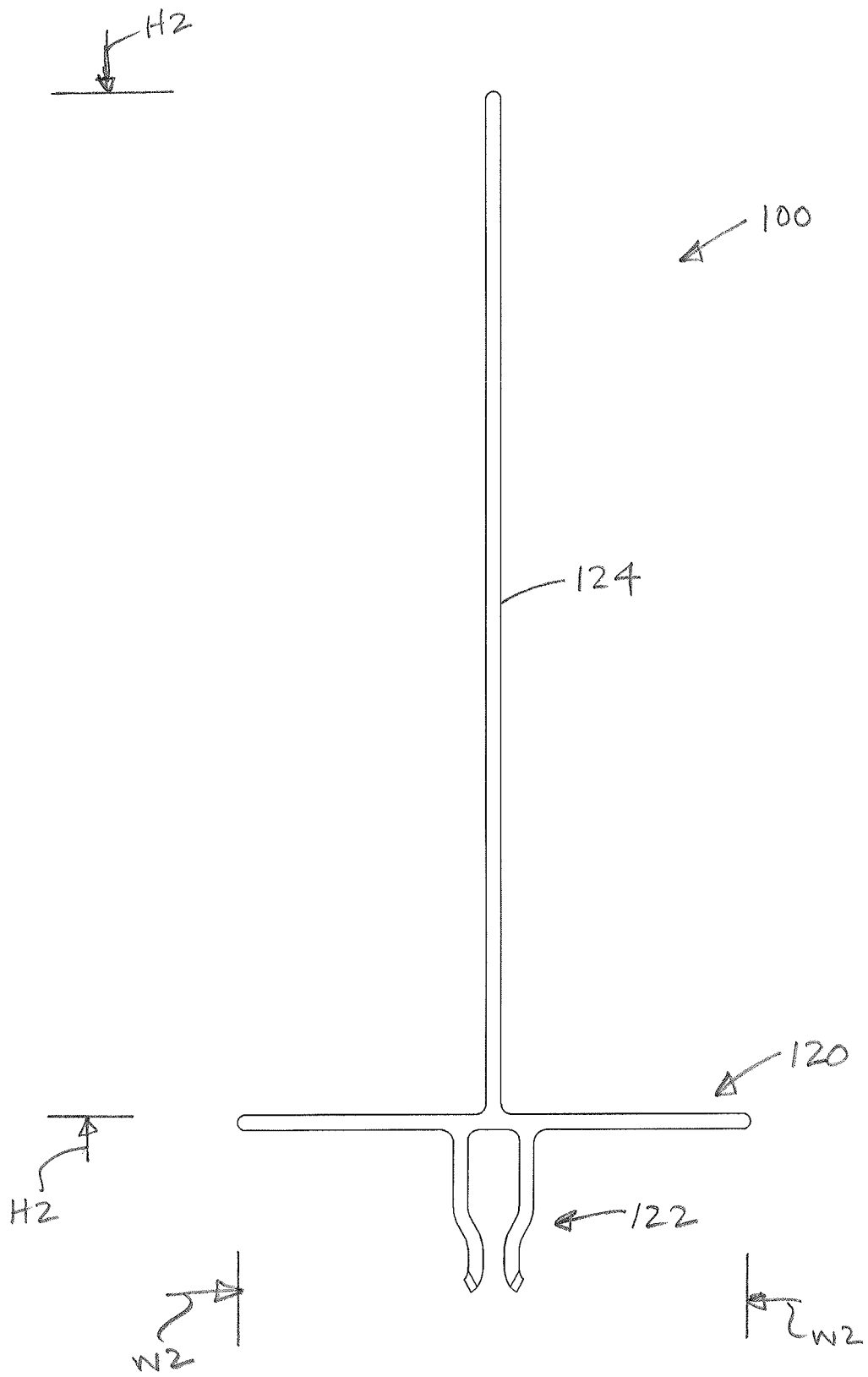
FIG. 6 is a left elevational view of the barrier strip of FIG. 5.
Figure 7:
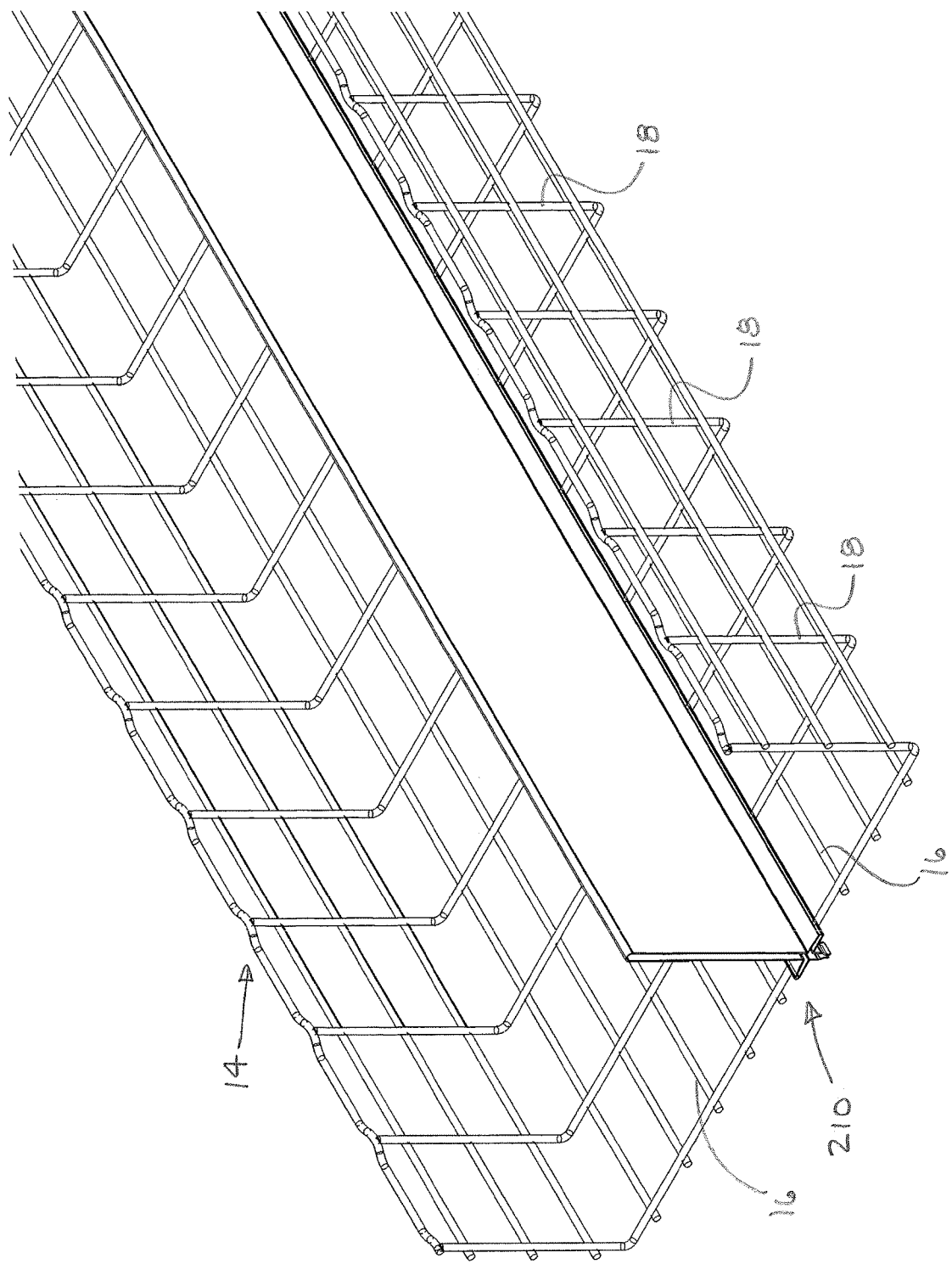
FIG. 7 is a partial perspective of a cable tray assembly including the cable tray of FIG. 1 and yet another embodiment of a barrier strip coupled to the cable tray.
Figure 8:
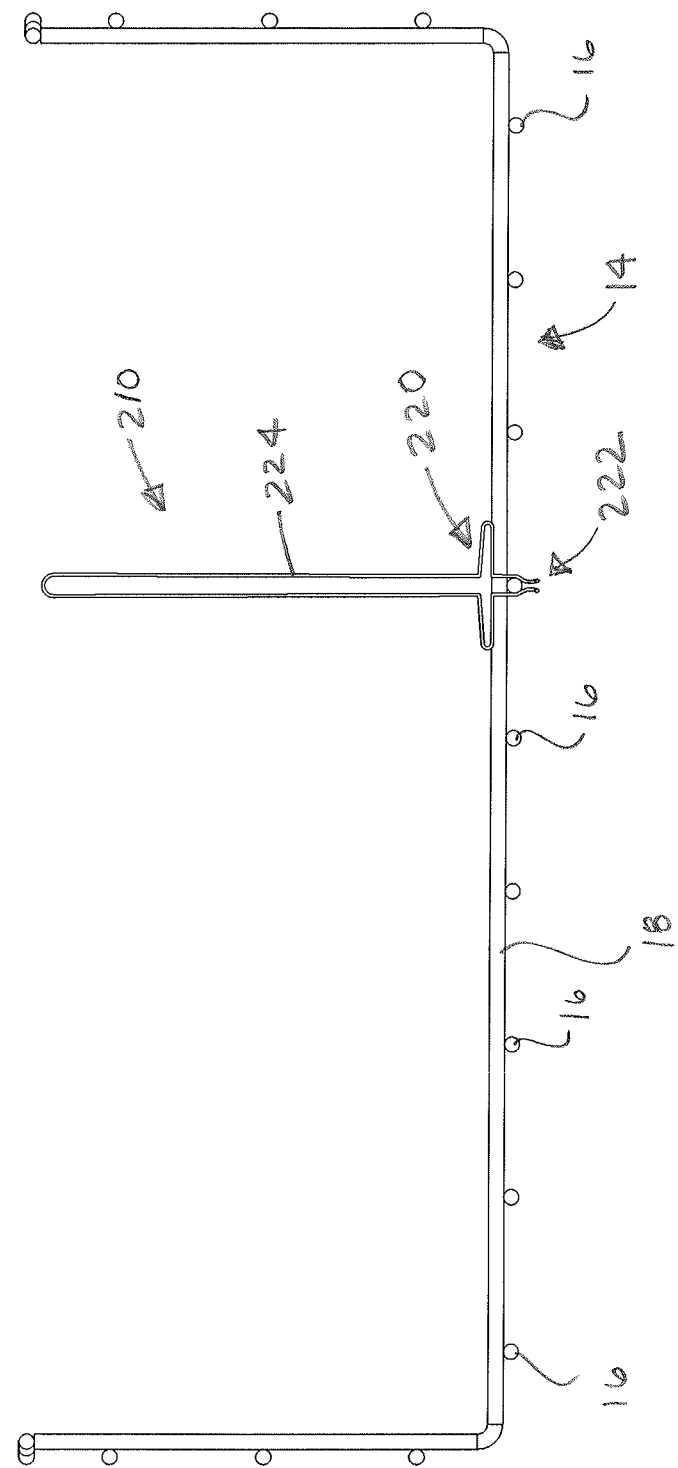
FIG. 8 is a left elevational view of the cable tray assembly of FIG. 7.
Figure 9:
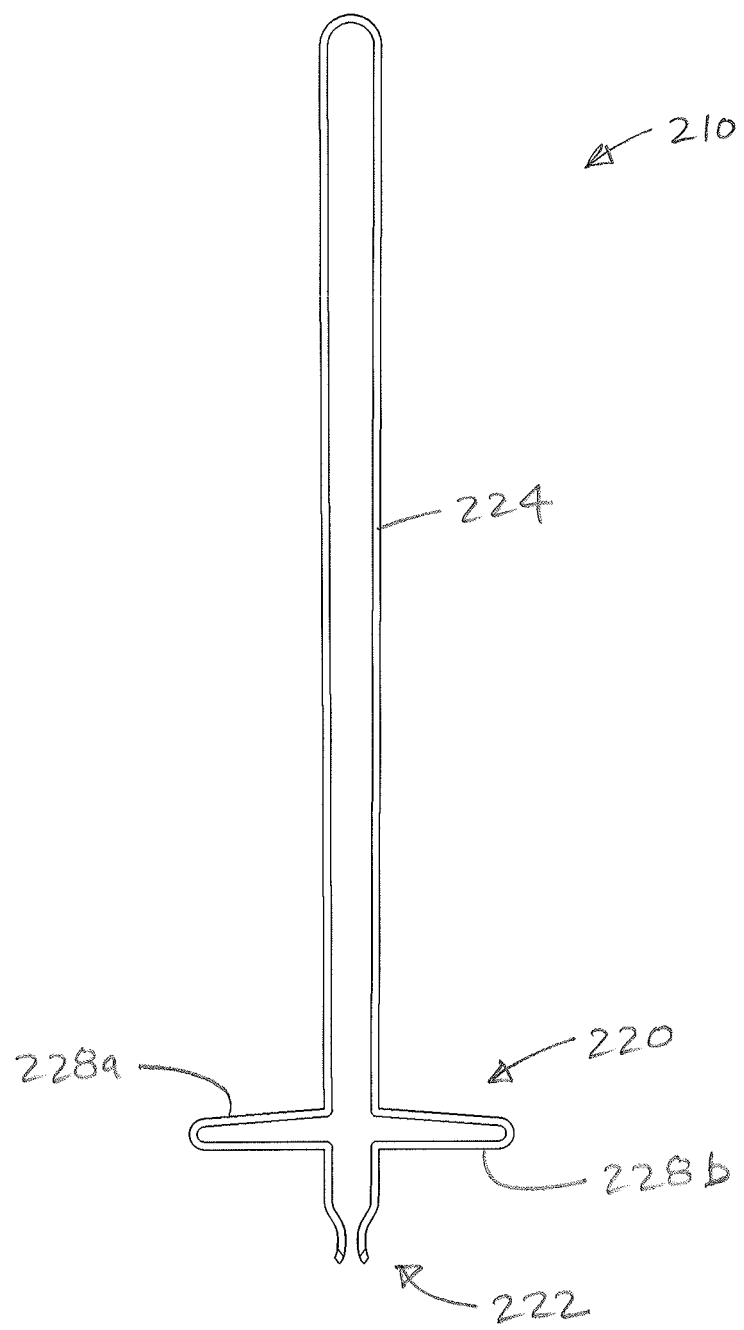
FIG. 9 is a left elevational view of the barrier strip of FIG. 7.

The base 20 is disposed vertically between the tray coupler 22 and the vertical wall 24. The base 20 includes left and right wings 28a, 28b extending laterally outward, in opposite directions, relative to the vertical axis V of the barrier strip 10. The illustrated wings 28a, 28b are generally transverse to the vertical axis V, and may lie substantially in a plane P that is generally orthogonal to the vertical axis. The left wing 28a extends laterally beyond the left sides of the vertical wall 24 and the tray coupler 22, and the right wing 28b extends laterally beyond the right sides of the vertical wall and the tray coupler. As shown in FIG. 2, the base 20 is configured to contact the cable tray 14 (e.g., rest on an upper surface of the cable tray) when the barrier strip 10 is coupled to the cable tray 14 to inhibit rotation or lateral tilting of the barrier strip 10 relative to the cable tray. In this regard, the base 20 may be generally rigid to inhibit bending of the base (e.g., bending of the wings 28a, 28b). In one example, a width W1 of the base 20 may measure from about 0.5 in (12.7 mm) to about 2.5 in (6.35 cm), although the base may have other widths. Referring to FIG. 6, in another embodiment, a barrier strip 100 includes a base 120 having a width W2 that is greater than the width W1 of the first barrier strip 10.

Referring to FIG. 3, the vertical wall 24 may be generally thin and have a height H1 extending from the base 20 and measuring from about 1.5 in (3.81 cm) to about 10 in (25.4 cm), although the vertical wall may have other heights. As shown in FIG. 2, the height H1 of the vertical wall 24 may correspond generally to a depth D of the tray 14, so that the vertical wall extends a majority or substantially an entirety of the depth of the tray. Referring to FIG. 6, in another embodiment, the barrier strip 100 includes a vertical wall 124 having a height H2 that is less than the height H1 of the first barrier strip 10.

As shown in FIGS. 1 and 2, the tray coupler 22 is configured to couple to one or more wires 16, 18 of the cable tray 14 without the use of additional fasteners. In the illustrated embodiment, the tray coupler 22 has a length extending along the length of the barrier strip 10 and is configured to couple to any one of the longitudinal wires 16. In the illustrated embodiment, the tray coupler 22 is a snap-fit component configured to couple to the one or more wires 16, 18 by a snap-fit connection. The tray coupler 22 includes opposing snap-fit arms 34 projecting downward from the base 20 and extending along the length of the barrier strip 10. The snap-fit arms 34 define a channel 36 extending along the length of the barrier strip 10. The channel 36 has a narrowed or tapered throat portion 38 adjacent a lower end of the coupler 22, and an enlarged wire-holding portion 40 adjacent an upper end of the coupler. A width W3 of the throat portion 38 is less than a diameter (or cross-sectional dimension) of the one or more wires 16, 18. In the illustrated embodiment, each arm 34 defines a shoulder 42 adjacent its lower end and extending toward the opposing arm to define the throat portion 38 of the channel 36. At least a portion of each arm 34 is resiliently deflectable relative to the base 20 and in a direction away from the opposing arm so that the width W3 of the throat portion 28 expands or increases as the longitudinal wire 16 passes through the throat portion to allow the larger diameter longitudinal wire 16 to enter into the wire-holding portion of the channel 36. The arms 34 rebound or snap back toward their initial positions upon the wire 16 entering the wire-holding portion 40 of the channel 36 so that the width W3 of the throat portion 38 is once again less than the diameter of the wire to effectively capture the wire in the wire-holding portion of the channel 36. Although each of the arms 34 are resiliently deflectable in the illustrated embodiment, in one or more other embodiments, only one of the arms may be resiliently deflectable. Moreover, although the illustrated shoulders 42 have gradual inward tapers, in one or more other embodiments the shoulders may be extend generally orthogonal to the remainder of the arms 34 The shoulders 42 may be generally in the form of hooks, beads, projections or other shapes.

In one or more embodiments, the tray coupler may be configured to couple to a plurality of the lateral wires 18. For example, the tray coupler may comprise a plurality of snap-fit components, similar to the design of the illustrated snap-fit component, but extending transverse to the length of the barrier strip 10 and spaced apart from one another a desired distance so that the snap-fit components are couplable to spaced apart lateral wires.

Referring to FIG. 4, the illustrated tray coupler 22 defines slots 48 spaced apart from one another along the length of the tray coupler. The slots 48 are sized and shaped to receive one or more lateral wires 18 of the cable tray 14 when the tray coupler 22 is coupled to the longitudinal wire 16. In particular, the locations of the slots 48 along the length of the tray coupler will correspond to the locations of the intersections of the longitudinal wire 16 and the lateral wires 18. In one embodiment, the slots 48 are spaced apart equally along the length of the tray coupler 22 and the distance d1 between adjacent slots generally correspond to the distance d2 (FIG. 1) between the lateral wires 18 along the length of the cable tray 10. In one example, the distances d3 between the longitudinal ends of the barrier strip 10 and the corresponding slots 48 adjacent the longitudinal ends are less than the distance d1 between adjacent slots so that end portions of the barrier strip 10 extends outward from the longitudinal ends of the cable tray 14 and are able to couple to an adjacent cable tray.

Referring to FIGS. 7-10, another embodiment of a barrier strip is generally indicated at reference numeral 210. This barrier strip 210 is similar to the barrier strips 10, 100 in that the barrier strip 210 includes a base 220, a tray coupler 222, a vertical wall 224, and slots 248 defined by the tray coupler. The main difference between this barrier strip 200 the barrier strips 10, 100 is that the barrier strip 210 is hollow and defined by a continuous, monolithic thin wall of material. Respective opposing lateral portions of the thin wall define the wings 228a, 228b of the base, and opposing vertical portions of the thin wall define the vertical wall 224. The tray coupler 222 is substantially similar to the tray couplers 22, 122. The barrier strip 10, 110, 210 may have other designs and constructions suitable for coupling the barrier strip to the cable tray 14 without the use of additional fasteners.

Having described embodiments of the invention in detail, it will be apparent that modifications and variations are possible without departing from the scope of the invention defined in the appended claims.

When introducing elements of the present invention or embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A barrier strip for a cable tray of the type including longitudinal wires and lateral wires interconnecting the longitudinal wires, the barrier strip comprising:
   a vertical wall extending along a length of the barrier strip; and
   a tray coupler disposed below the vertical wall, the tray coupler configured to couple to one or more of the longitudinal and lateral wires of the cable tray without the use of additional fasteners,
   wherein the vertical wall and the tray coupler are integrally formed as a one-piece, monolithic component,
   wherein the tray coupler defines slots spaced apart from one another along the tray coupler,
   wherein the slots are sized and shaped to receive one or more lateral wires of the cable tray when the tray coupler is coupled to longitudinal wires, and
   wherein the slots of the tray coupler comprise an end slot and an adjacent slot adjacent to the end slot, the end slot being spaced a first distance from a longitudinal end of the tray coupler and a second distance from the adjacent slot, the first distance being less than the second distance.

2. The barrier strip of claim 1, further comprising a base disposed vertically between the vertical wall and the tray coupler, wherein the base extends in a direction generally transverse to the vertical wall.

3. The barrier strip of claim 2, wherein the base includes left and right wings extending laterally outward in opposite directions.

4. The barrier strip of claim 2, wherein the base is configured to contact the cable tray when the barrier strip is coupled to the cable tray and inhibit rotation of the barrier strip relative to the cable tray.

5. The barrier strip of claim 1, wherein the tray coupler comprises a snap-fit component configured to couple to the one or more of the longitudinal and lateral wires by a snap-fit connection.

6. The barrier strip of claim 5, wherein the snap-fit component comprises opposing snap-fit arms defining a channel configured to receive the one or more of the longitudinal and lateral wires.

7. The barrier strip of claim 2, wherein the tray coupler comprises a snap-fit component configured to couple to the one or more of the longitudinal and lateral wires by a snap-fit connection.

8. The barrier strip of claim 7, wherein the snap-fit component comprises opposing snap-fit arms extending downward from the base and defining a channel configured to receive the one or more of the longitudinal and lateral wires.

9. A cable tray assembly comprising:

a cable tray comprising:

interconnected longitudinal wires and lateral wires defining a bottom and opposite side walls extending upward from the bottom to define a depth of the cable tray;

a barrier strip comprising:

a vertical wall extending along a length of the barrier strip, wherein the vertical wall has a height that extends at least a majority of the depth of the cable tray, and a tray coupler disposed below the vertical wall, the tray coupler configured to couple to a single longitudinal wire of the cable tray without the use of additional fasteners.

10. The barrier strip of claim 9, further comprising a base disposed vertically between the vertical wall and the tray coupler, wherein the base extends in a direction generally transverse to the vertical wall.

11. The barrier strip of claim 10, wherein the base is configured to contact the cable tray when the barrier strip is coupled to the cable tray and inhibit rotation of the barrier strip relative to the cable tray.

12. The barrier strip of claim 9, wherein the tray coupler comprises a snap-fit component configured to couple to the single longitudinal wire.

13. The barrier strip of claim 12, wherein the snap-fit component comprises opposing snap-fit arms defining a channel configured to receive the single longitudinal wire.

14. The barrier strip of claim 13, wherein the tray coupler comprises a snap-fit component configured to couple to the single longitudinal wire.

15. The barrier strip of claim 1, wherein when the tray coupler is coupled to the cable tray, the longitudinal end of the tray coupler extends outward from a longitudinal end of the cable tray so that the end slot is configured to couple to an adjacent cable tray.

\* \* \* \* \*